United States Patent [19]

Helmes et al.

[11] E Re. 28,654

[45] Reissued Dec. 16, 1975

[54] METHOD FOR GLUING A STRIP OF MATERIAL AGAINST THE SIDE OF A FLAT WORK PIECE, LIKE A TABLE LEAF, AND A DEVICE FOR PERFORMING THIS METHOD

[75] Inventors: Gerardus P. Helmes; P. M. Helmes; Christiaan T. Helmes; Johan P. H. Helmes; Franciscus J. Helmes, all of Steyl-Tegelen, Netherlands

[73] Assignee: Helmes Machinefabriek N.V., Netherlands

[22] Filed: Oct. 24, 1973

[21] Appl. No.: 409,087

Related U.S. Patent Documents

Reissue of:

[64] Patent No.: 3,655,479
Issued: Apr. 11, 1972
Appl. No.: 811,098
Filed: Mar. 27, 1969

[30] Foreign Application Priority Data

Apr. 2, 1968 Netherlands ..... 6804576

[52] U.S. Cl. ..... 156/212; 156/202; 156/216; 156/447

[51] Int. Cl.[2] ..... B29C 17/02

[58] Field of Search ..... 156/212, 202, 216, 447, 156/213, 320, 425, 462, 107, 116; 274/39–39.1; 272/31; 52/613, 614; 118/320

[56] References Cited

UNITED STATES PATENTS

| | | | |
|---|---|---|---|
| 891,428 | 6/1908 | Latus | 156/462 X |
| 2,709,400 | 5/1955 | Bugg | 156/425 |
| 2,880,697 | 4/1959 | Blanding et al. | 118/320 |
| 3,218,208 | 11/1965 | Molen | 156/116 |
| 3,492,146 | 1/1970 | Kornaker | 118/320 X |

FOREIGN PATENTS OR APPLICATIONS

| | | | |
|---|---|---|---|
| 543,346 | 12/1955 | Belgium | 274/39.1 |

*Primary Examiner*—Maynard R. Wilbur
*Assistant Examiner*—G. E. Montone
*Attorney, Agent, or Firm*—Irving M. Weiner

[57] ABSTRACT

Apparatus for applying an adhesive strip to a peripherally irregularly contoured edge of a panel by moving the panel contiguously passed an adhesive strip applicator roller. The panel is held in broadside relation on a centerless table capable of rotatable rectilinear and general plain motions which is supported by and shiftable on a bed. A cam having a contour conforming substantially to the peripherally irregularly contoured edge of the panel is carried by the table. The table is driven by driving and pressure rollers which engage the cam and rotate at a constant angular speed. Thus, the irregularly contoured periphery of the panel is movable past the applicator at varying surface speeds to ensure equal pressure application of the adhesive along the entire periphery of the panel.

9 Claims, 3 Drawing Figures

METHOD FOR GLUING A STRIP OF MATERIAL AGAINST THE SIDE OF A FLAT WORK PIECE, LIKE A TABLE LEAF, AND A DEVICE FOR PERFORMING THIS METHOD

Matter enclosed in heavy brackets [ ] appears in the original patent but forms no part of this reissue specification; matter printed in italics indicates the additions made by reissue.

SUMMARY OF THE INVENTION

The invention resides in the provision of a centerless shiftable turntable to support a panel having a peripherally irregularly contoured edge onto which an adhesive stripe is fed and pressed against the panel periphery. A cam or master templet is carried by the turntable, the cam having a contour substantially comparable to the peripherally irregularly contoured edge of the panel. The centerless turntable is edge driven by driven rollers which frictionally engage and drive the cam and hence the turntable. Since the turntable does not revolve about a fixed axis but instead moves or shifts in accordance with the contour of the cam, it follows that the peripheral speed of the irregularly contoured periphery of the panel is substantially constant whereby the adhesive strip applicator roller applies constant pressure along the entire periphery of the panel.

The invention relates to apparatus for gluing a strip of material on the edge of a flat work piece, like a table leaf, the work piece being driven so as to move in its own plane while feeding simultaneously an adhesive strip which by means of a resiliently urged roller is pressed against the edge of the work piece.

Apparatus is known in various versions, whereby mostly the work piece is laid on the supporting surface of the machine and a rotary motion is imparted thereto by means of one or more drive rollers engaging the side of the work piece.

A problem often encountered with present apparatus is that on e.g. slightly fancifully shaped articles, e.g., a table leaf with an incision or an acute angle, the rotation of the work piece is very irregular or even blocked up. There are moments at which the rotation is effected at a desired rate which are succeeded by moments at which—owing to the passage of reentering or salient angles—suddenly a great acceleration of the rotation is produced. It may occur at the latter moments that the resiliently urged press roller by which the strip of material is pressed against the side of the work piece is no longer capable of following exactly the shape of the edge, so that at those locations an insufficient adherence of the side strip is produced. On applying a glue roller, which cooperates with the edge of the work piece, a protruding part of the work piece may jam between the glue roller and a drive roller.

It is an object of the invention to provide an apparatus in which the drive of the work piece is such that a very uniform motion thereof is obtained while avoiding the aforementioned drawbacks. This object is attained according to the invention by connecting the work piece with a model or gauge which is provided with a free circumferential edge, the gauge being substantially of the same form as the work piece, whereby the drive for the motion of the work piece engages the circumferential edge of the gauge. Due to the application of a gauge all acute angles and curves of the work piece can be smoothed on shaping the gauge, so that The rotary rectilinear and general plane motions of the gauge with the work piece can remain very regular which results in that the periphery of the work piece moves in a very regular way along the press roller. So the side strip is well pressed at all locations.

The invention relates further to a gluing machine comprising at least one roller for moving a flat work piece in a rotary motion on the table and further a feeder for a strip to be glued, a glue roller for providing the glue between the strip and the side of the work piece and resiliently urged press roller for pressing the strip against the side.

Rotary motion is defined as angular motion of a body about a point wherein all particles in the body move in circular paths about the point of rotation, and all lines in the body (including those that do not pass through the point) rotate through the same angle in the same time interval. Rectilinear motion is defined as motion of a body wherein all points in the body move in straight lines. General plain motion is defined as a combination of translation and rotation, accomplished by a translatory motion of a body together with a center of rotation and a rotation of the body about this center.

According to the invention the drive rollers for the machine for setting the work piece into a motion have an axis of rotation which is perpendicular to the plane whereby the feeder of the strip as well as the glue roller and the resiliently urged press roller are situated at a distance from the plane of the table greater than the height of the drive roller.

Due to these features the machine operates at two levels, that is to say a lower level on which the driver rollers cooperate with the gauge and an upper level on which the work piece cooperates with the press roller and the adhesive strip.

According to an embodiment of the gluing machine in conformity with the invention two drive rollers are provided, one of the drive rollers being resiliently urged toward the other in such away that in the area of approach between the two rollers a narrow edge, e.g. provided near the circumference of the gauge, can be clamped. In this machine a gauge can be used with a ridge along its circumference which is being clamped between the two rollers, whereby all curves and angles of the gauge and also of the work piece can be accurately and uniformly followed.

The foregoing and other objects of the invention will appear in the description to follow with reference to the accompanying drawing in which an embodiment of the gluing machine according to the invention is represented.

Figure 1:
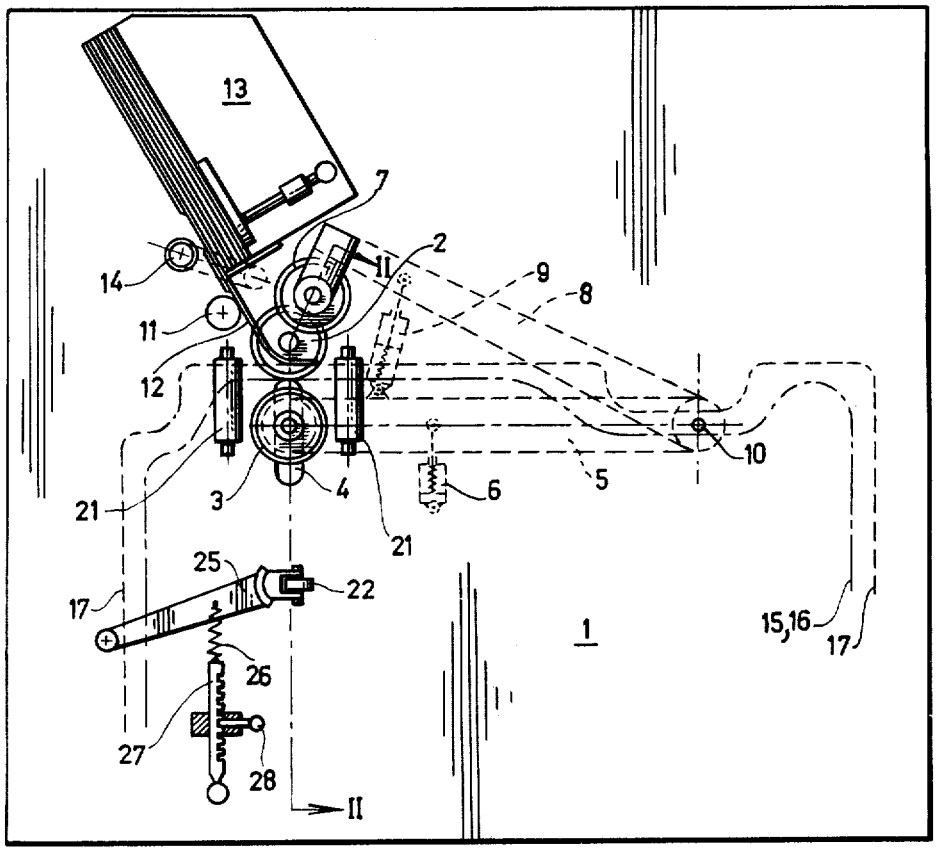
FIG. 1 is a plan view of the machine.
Figure 2:
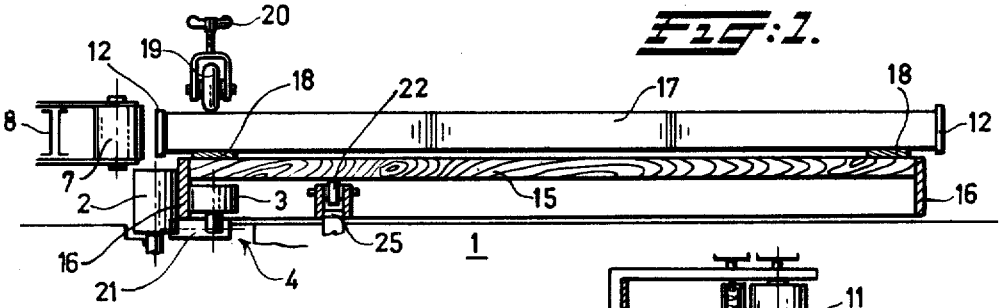
FIG. 2 shows a section according to the line 11—11 in FIG. 1, a gauge with a work piece being represented and for the rest only some rollers of the machine being shown.

As best is seen in FIGS. 1 and 2 the machine consists of a base 1, having a bed provided with a stationary drive roller 2 the axis of rotation of which is perpendicular to the plane of the bed. A second drive roller 3 is furthermore provided, which is movably arranged in a slit 4 in the face of the table 1. By means of an arm 5 and a pneumatic pressure device 6 this roller 3 is ressed in the direction of the roller 2. These rollers are artially lying in and for the rest over the plane of the able 1.

A press roller 7, supported on an arm 8 is urged ward the right in FIG. 2 by a pneumatic device 9. The oller 7 is positioned over the table plane at a distance eater than that of the rollers 2 and 3. The two arms 5 nd 8 pivot in this embodiment about a common pivtal point 10. The device 9 is at its ends connected with ne arms 5, and 8 respectively.

The machine is further provided with a glue roller 11 nd feeding means for an adhesive strip 12. The strip 2 is supplied from a veneer container 13. A small, kewise pneumatically pressed, roller 14 serves to feed orward the strip 12. The glue roller 11 and feeding neans in the strip 12 are at the same level as the resilntly urged press roller 7.

As likewise is seen in the FIGS. 1 and 2 the apparatus ncludes a table 15 which along its periphery is proided with a cam or gauge 16. The cam 16 has a lower dge which bears on the bed of the base 1 and further clamped between and by the rollers 2 and 3. The ork piece 17 bears on the table 15 via some pieces of onskid material 18. The cam 16 is represented by dotash lines in FIG. 1, while the work piece 17 is repreented by a dotted line. In this figure only the roller 2 is n touch with the cam 16 of the table 15, whereas the oller 3 is at some distance therefrom. Also the roller 7 depicted at some distance from the periphery of the ork piece. The rollers 2 and 3 are each connected ith a drive (not shown), so that on clamping the cam 6 between the rollers 2 and 3 the table 15 is moved on ne bed of the base 1. Simultaneously the roller 7 will ress against the peripheral edge of the work piece 17 nd press in this way the adhesive strip 12 against the dge of the work piece.

An upper roller 19 is provided in order to connect rmly the work piece 17 with the table 15 and which by neans of a hand wheel 20 can press with an adjustable orce upon the upper side of the work piece. The upper oller 19 is constructed as a freely rotatably supported wivelling roller. In order to reduce the slide friction wo supporting rollers 21 are provided on either side of ne area of approach of the drive rollers 2 and 3. The xis of rotation of the supporting rollers 21 is lying parllel to and near the plane of the bed of base 1. The pper roller 19 is situated over the area between the upporting rollers 21. A third supporting roller 22, likeise constructed as a swivelling roller, cooperates with he underside of the table 15. In this way the table 15 together with the work piece 17) is moved without nuch friction on the bed of the base 1.

Figure 3:
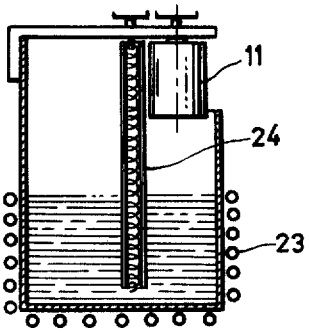
FIG. 3 is a section to an enlarged scale of a detail of the machine according to FIG. 1 and relating to the supply of glue.

The glue roller 11 is, as is best seen in FIG. 3, conected in the usual way with a glue container 23, which s provided with heating means. Via a lifting device 24 he glue is transferred to the roller 11. The glue roller, oo, is provided with an (electric) heating means for its urface, so that the glue does not prematurely solidify. The heating of the roller 11 is controlled in such a way hat a minor fluctuation of the desired temperature can ccur. For that purpose on raising the temperature of he surface of the roller the heating means is already witched off before the desired temperature value is eached. The temperature of the roller keeps rising for moment. When the temperature falls the current is lready switched on before the temperature has fallen elow the desired value. In this manner the temperaure of the roller fluctuates within limits on either side of the desired value. The temperature feeler which is connected with a thermostat is positioned on the outer side of the glue roller and is therefore in touch with the glue layer on the surface of the roller.

In this way the strip 12 is firstly glued on the peripheral edge of the work piece. The supply of glue can if desired be stopped or interrupted when an adhesive strip from the supply container 13 is applied, precoated with a glue layer. This layer of the adhesive strip 12 can now be softened by the aid of the heated roller 11 in order to ensure a proper adherence to the work piece.

The location of the supporting roller 22 is adjusted according to the shape and dimensions of the work piece (and of the table 15). For that purpose this roller is connected with pivoted arm 25 the position of which is determined via a spring 26 by a rod 27 with a latch 28.

In operation the drive roller 3 will be vigorously pressed against the inner side of the cam 16. For that purpose a considerable pressure is supplied in the pneumatic device 6. The press roller 7 is also pressed with a certain force against the periphery of the work piece 17 which is effected by supplying pneumatic pressure in the pressure device 9.

In this way a continuous and undisturbed drive of the gauge 15 can be effected via the rollers 2 and 3, whereby the rotable, rectilinear and general plane motions of the work piece will be regular and uniform, so that the press roller 7 can effect a uniform pressure along the entire peripheral edge of the work piece.

It should be noted that the machine is not only suitable for continuously disposing a side strip along the edge of a circular work piece, but also against straight or curved portions of an angular work piece.

The advantages and the apparatus according to the invention can be summarized as follows:

due to the fact that a cam is applied it becomes possible to obtain a very regular drive and rotable, rectilinear and general plane motions of the work piece in such a way that the press roller can regularly press the adhesive strip at an almost constant pressure, so that an edge strip is well secured on the entire peripheral edge of the work piece;

an irregularly contoured edge of the work piece, including acute angles, and recesses can be smoothly followed due to the right design of the gauge, so that the press roller can carry out its function in an undisturbed way;

the friction between the cam and the work piece on the one hand and the table on the bed on the other hand is for the greater part eliminated due to the application of the three supporting rollers, so that the power required for performing the operation need not be great;

the application of a glue roller which is exclusively in touch with the side strip to be attached is advantageous in that in the same machine a precoated side strip with a previously provided glue layer can be used, the glue roller need only have conventional heating means in order to soften the glue layer so that the strip can be attached to the work piece;

by the aid of differently profiled press rollers 7 it becomes possible to deal with work pieces having a flat, convex, or concave edge.

What is claimed is:

1. An apparatus for applying an adhesive strip to a peripherally irregularly contoured edge of a panel comprising a base having a bed, a table supported freely on the bed of said base and shiftable horizontally thereon to allow rotary, rectilinear and general plane motions of said table, said table to support a panel and broadside relation thereto having a peripherally irregularly contoured edge, means to hold said panel to said table for rotary, rectilinear and general plane motions therewith, a pressure roller overlying the periphery of the panel to press an adhesive tape against the edge of the panel as the panel moves with said table, a driven cam affixed to said table and having a peripheral surface conforming substantially to the peripherally irregularly contoured edge of the panel, a driving means mounted on said base and engaging said cam to impart motion to said cam and table, and resilient means mounted on said base urging said cam against said driving roller.

2. Apparatus as defined in claim 1, in which the cam is a downturned flange of said table with said driving means engaging the outer surface of the flange, and a pressure roller engaging the inner surface of said flange and urged thereagainst by said resilient means.

3. Apparatus as defined by claim 1, wherein said holding means includes pressure means urging said panel broadside toward said table.

4. Apparatus as defined by claim 2, with the addition of friction pads on said table to engage the underside of the panel.

5. Apparatus as defined by claim 4, wherein said cam extends along and forms the peripheral edge of said table.

6. A method of gluing a strip of material against the edge of a flat work piece, such as a table top, comprising the steps of:

placing said flat work piece on a support;

driving said support in rotable, rectilinear in general plane motions in its own plane while the glued strip of material is simultaneously fed and pressed against said edge of said flat work piece;

adapting the shape of said support to the shape of said flat work piece by providing the edge of said support with a cam strip which substantially follows said edge of said flat work piece while smoothing out the sharp corners thereof;

and placing said cam strip between two opposite drive rollers for gluing said strip to said edge of said flat work piece in such a manner that the remainder of said support is free to move in its own plane.

7. An apparatus for gluing a strip of material against the edge of a flat work piece, such as a table top, comprising in combination:

means for carrying a support capable of rotary rectilinear and general plane motion;

a cam strip provided along the edge of said support;

a pair of drive rollers for engaging opposite sides of said cam strip provided along the edge of said support;

the axis of each of said drive rollers being disposed substantially perpendicular to the plane of said support;

means for supplying a glued strip;

a resiliently biased press roll for said glued strip being mounted at a higher level than said drive rollers;

and said resiliently biased press roll being adapted to coact with the edge of said flat work piece deposited on said support.

8. An apparatus characterized substantially in accordance with claim 7, wherein both of said drive rollers are driven, and one of said rollers is resiliently biased towards the other for holding said cam strip therebetween.

9. An apparatus characterized substantially in accordance with claim 8, wherein said press roll is mounted on a pivoting arm which is resiliently coupled to a pivoting arm carrying the resiliently biased drive roller, and a glue supplying roller is mounted in the supply part of said strip at a position spaced from said work piece.

* * * * *